Figure 1:
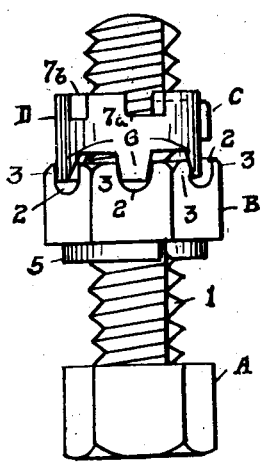

Feb. 12, 1929.

M. A. SISK 1,701,511

LOCKING DEVICE FOR NUTS AND BOLTS AND THE LIKE

Filed Aug. 13, 1926

INVENTOR
Martin A. Sisk.
by Edward A. Lawrence,
his attorney

Patented Feb. 12, 1929.

1,701,511

UNITED STATES PATENT OFFICE.

MARTIN A. SISK, OF PITTSBURGH, PENNSYLVANIA.

LOCKING DEVICE FOR NUTS AND BOLTS AND THE LIKE.

Application filed August 13, 1926. Serial No. 128,972.

Among the objects which I have in view is the provision of an improved means for preventing accidental relative rotation between a bolt or the like and a nut, which will be convenient to install and remove, and which will be inexpensive, efficient and durable, and which will be capable of repeated uses.

Another object which I have in view is the provision of such locking means which will lock the nut in its nicely adjusted position without requiring an overtightening of the nut or a backing-off of the nut before the locking can be effected.

The accomplishment of other objects will be apparent to those skilled in the art from the following description.

In general, my invention presents the following characteristics.

I provide an adjustment member or sleeve which slips down over the outer end of the bolt into engagement with the nut to prevent relative rotation between the sleeve and the nut, the inner end of the sleeve in the embodiment shown in the accompanying drawings being provided with means interlocking with the nut, such as tongues, which fit into the corresponding seats of the nut to hold the nut and sleeve against relative rotary movement, while the outer end of the sleeve is provided with a seat or an annular series of seats with the proper one of which a registering key leg is bent down in engagement to lock the sleeve to the bolt. To insure registration between one of the sleeve seats and the key the said seats are offset to progressively increased extents relative to the tongues of the sleeve. This effect may be accomplished by providing the sleeve with a seat or seats properly offset from alinement with the tongues of the sleeve.

Thus a sleeve with but one offset seat would by proper adjustment of its position relative to the nut double the number of locking positions of which the device is capable. By providing the sleeve with a plurality of seats the locking positions will be multiplied accordingly. For instance, the use of a sleeve with five locking seats in combination with a nut having six locking seats would provide thirty-six locking positions including the six available by the use of the nut without the sleeve.

Various methods of engaging the inner end of the key with the inner end of the nut, to prevent outward movement of the key relative to the nut, may be employed. I prefer to provide the inner end of the key with an annular portion or ring which is more advantageously a split ring and which surrounds the bolt and bears against the inner end of the nut. However, the inner end of the key may simply be bent outwardly to engage the inner end of the nut, the inner end of the nut being in such cases countersunk to receive the inner end of the key.

Other novel features of construction, and also of arrangement of parts will appear from the following description.

Figure 3:
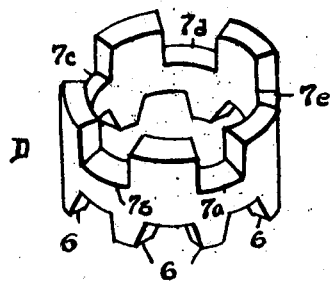
Figure 2:
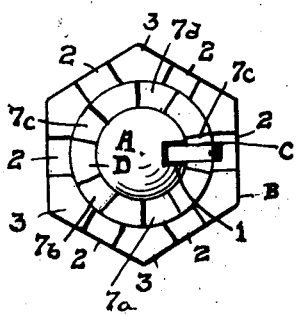
Figure 4:
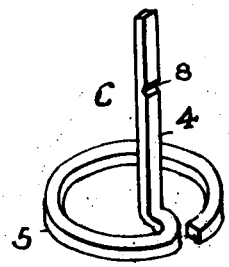
Figure 5:
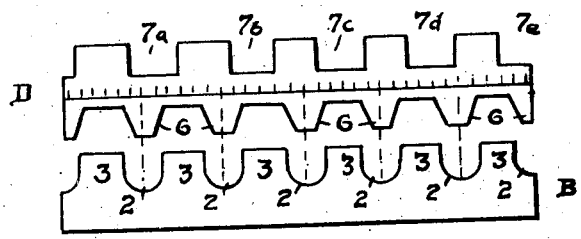

In the accompanying drawings, wherein I have illustrated the best embodiment of the principles of my invention now known to me, Fig. 1 is an elevation showing a nut locked on a bolt; Fig. 2 is a plan view of the same; Fig. 3 is an enlarged perspective of the sleeve; Fig. 4 is a perspective of the preferred form of locking key, and Fig. 5 is a diagrammatic view showing the relation between the seats in the sleeve and the seats in the nut.

Referring to the drawings, A is the bolt, B the nut, C the key and D the locking sleeve.

The bolt A is provided with a longitudinally disposed groove 1 intersecting its threaded portion and in the drawings the outer end of the nut B is shown provided with an annular series of radially disposed seats 2, said seats being preferably equally spaced apart and separated by the shoulders 3.

The key C has a straight leg 4 which is received in the slot 1 of the bolt and the inner end portion of the key is formed to engage the inner end of the nut to prevent the key accidentally slipping from place. Thus I have shown a ring 5 integral with the inner end of the key which surrounds the bolt A and bears against the inner end of the nut.

Where the sleeve D is not employed, when the nut has been screwed up, the outer protruding end of the key is bent outward, radially of the bolt into engagement with one of the seats 2 of the nut.

When my improved locking sleeve is used the end of the key which protrudes past the sleeve is bent over into engagement therewith.

The locking sleeve D is provided at one end with means whereby it may be engaged with the nut so as to prevent relative rotation between the same.

Thus the inner end of the sleeve may be provided with spaced apart tongues 6 preferably equal in number with the seats 2 of the nut and adapted to interlock therewith when the sleeve is in place on the bolt, as shown in Fig. 1. The tongues 6 are preferably slightly tapered toward their free ends to facilitate such interlocking.

The outer end of the sleeve D is shown provided with a series of sunken seats, indicated at $7^a$, $7^b$, $7^c$, $7^d$ and $7^e$, with the registering one of which the leg 4 of the key C is bent down into engagement, as shown in Fig. 1.

The sleeve D may be provided with but a single seat 7 offset from alinement with a tongue 6, and by properly adjusting the sleeve relative to the nut the number of positions of the nut in which it may be locked will be doubled, the sleeve being positioned relative to the nut so that its seat may be offset from any one of the nut seats to the proper degree to bring the sleeve seat into registration with the key.

However, I prefer to provide the sleeve with a plurality of seats, each seat having a different offsetting, as illustrated in Fig. 5. Thus, as shown by the graduations and dotted center lines, when the sleeve and nut are mated in the relative position indicated in Fig. 5, the sleeve seat, $7^a$ is offset one point from the nut seat 2, and may be offset to a like amount from any of the other nut seats by turning the sleeve into the proper position before mating. Likewise the seat $7^b$ is offset two points; the seat $7^c$ three points; the seat $12^d$ four points, and the seat $7^e$ five points.

Thus when the nut B has been screwed into its properly adjusted position and none of its locking seats is in registration with the key, the sleeve D is then installed and mated with the nut B in such position as to bring the sleeve seat which has the necessary offset value into registration with the key, and the key is then bent down into locking engagement with said sleeve seat.

The leg 4 of the key is preferably notched as at 8 to facilitate its bending and straightening at the same point.

The material of the sleeve D should be of sufficient guage to prevent its entering between the nut and the bolt and to enable it to bear on the outer end of the nut and to mate firmly therewith.

It is evident that the nut need not be screwed entirely on the bolt, to enable it to be locked fixedly in position relative to the bolt by the use of my invention, a key of the proper length to protrude past the bolt and nut being provided. Likewise the nut may be locked on the bolt when the sleeve is used in combination with the nut and when the sleeve protrudes past the end of the bolt.

It will be understood that where extra locking strength is required or desired, two or more keys or key legs may be arranged to simultaneously register and interlock with seats of the nut or sleeve.

What I desire to claim is:—

1. In a nut and bolt locking device, the combination with a bolt having a longitudinally disposed groove intersecting its threaded portion and a nut having its outer end provided with an annular series of radially disposed seats, a sleeve adapted to be slipped on over the outer end of the bolt and arranged to interlock with the nut to prevent relative rotation between the nut and the sleeve, the outer end of the sleeve being provided with a seat offset to prevent alinement with the seats of the nut, and a key having its body received in the groove and having its outer end, after the nut and sleeve are adjusted on the bolt, bent radially of the bolt into engagement with the seat of the sleeve.

2. In a nut and bolt locking device, the combination with a bolt having a longitudinally disposed groove intersecting its threaded portion and a nut having its outer end provided with an annular series of radially disposed seats, a sleeve adapted to be slipped on over the outer end of the bolt and arranged to interlock with the nut to prevent relative rotation between the nut and the sleeve, the outer end of the sleeve being provided with a series of seats progressively offset to prevent alinement with the seats of the nut so that said sleeve may be adjusted relative to the nut to bring one of the sleeve seats into registration with the bolt groove, and a key having its body received in the groove and its outer end protruding past the sleeve, when the nut and sleeve have been adjusted into position, being bent radially of the bolt into engagement with the registering sleeve seat.

3. In a nut and bolt locking device, the combination with a bolt having a longitudinally disposed groove intersecting its threaded portion and a nut having its outer end provided with an annular series of radially disposed seats, a sleeve adapted to be slipped on over the outer end of the bolt and arranged to interlock with the nut to prevent relative rotation between the nut and the sleeve, the outer end of the sleeve being provided with a seat offset to prevent alinement with the seats of the nut, and a key having its body received in the groove and having its outer end, after the nut and sleeve are adjusted on the bolt, bent radially of the bolt into engagement with the seat of the sleeve, the inner end of the key being provided with an outwardly projecting portion which bears against the inner end of the nut.

4. In a nut and bolt locking device, the combination with a bolt having a longitudinally disposed groove intersecting its threaded portion and a nut having its outer end provided with an annular series of radially disposed seats, a sleeve adapted to be slipped on over the outer end of the bolt and arranged to interlock with the nut to prevent relative rotation between the nut and the sleeve, the outer end of the sleeve being provided with a series of sunken seats progressively offset to prevent alinement with the seats of the nut so that said sleeve may be adjusted relative to the nut so as to bring one of the sleeve seats into registration with the bolt groove, and a key having its body received in the groove and its outer end protruding past the sleeve, when the nut and sleeve have been adjusted into position, being bent radially of the bolt into engagement with the registering sleeve seat, the inner end of the key being provided with an outwardly projecting portion which bears against the inner end of the nut.

5. In a nut and bolt locking device, the combination with a bolt provided with a key-way, a nut screwed on said bolt, of a sleeve slipped on the outer end of the bolt and engaged with the nut to prevent relative rotation between the nut and the sleeve, and a key in said key-way and engaging the sleeve to prevent relative rotation between the sleeve and the bolt.

6. In a nut and bolt locking device, the combination with a bolt provided with a key-way, a nut screwed on said bolt, of a sleeve slipped on the outer end of the bolt and engaged with the nut to prevent relative rotation between the nut and the sleeve, said sleeve being provided with a plurality of key seats, and a key in said key-way and engaging one of said seats to prevent relative rotation between the bolt and the sleeve.

7. In a nut and bolt locking device, the combination with a bolt provided with a key-way, a nut screwed on said bolt, of a sleeve slipped on the outer end of the bolt and engaged with the nut to prevent relative rotation between the nut and the sleeve, the outer end of said sleeve being provided with a concentrically arranged series of seats, and a key in said key-way and engaging one of said seats to prevent relative rotation between the sleeve and the bolt.

8. In a nut and bolt locking device, the combination with a bolt and a nut screwed on said bolt, of a sleeve on the outer end of the bolt and engaged with the nut to prevent relative rotation in either direction between the nut and the sleeve, and a member detachably engaging said sleeve and said bolt to prevent relative movement therebetween.

Signed at Pittsburgh, Pa., this 12th day of August, 1926.

MARTIN A. SISK.

CERTIFICATE OF CORRECTION.

Patent No. 1,701,511.  Granted February 12, 1929, to

MARTIN A. SISK.

It is hereby certified that error appears in the above numbered patent requiring correction as follows: In the drawing, Figure 2, at the top right for the reference numeral "7c" read "7e"; page 2, line 34, after the word "seat" strike out the comma, and line 40, for the reference numeral "12d" read "7d"; and that the said Letters Patent should be read with these corrections therein that the same may conform to the record of the case in the Patent Office.

Signed and sealed this 19th day of March, A. D. 1929.

(Seal)
M. J. Moore,
Acting Commissioner of Patents.